UNITED STATES PATENT OFFICE.

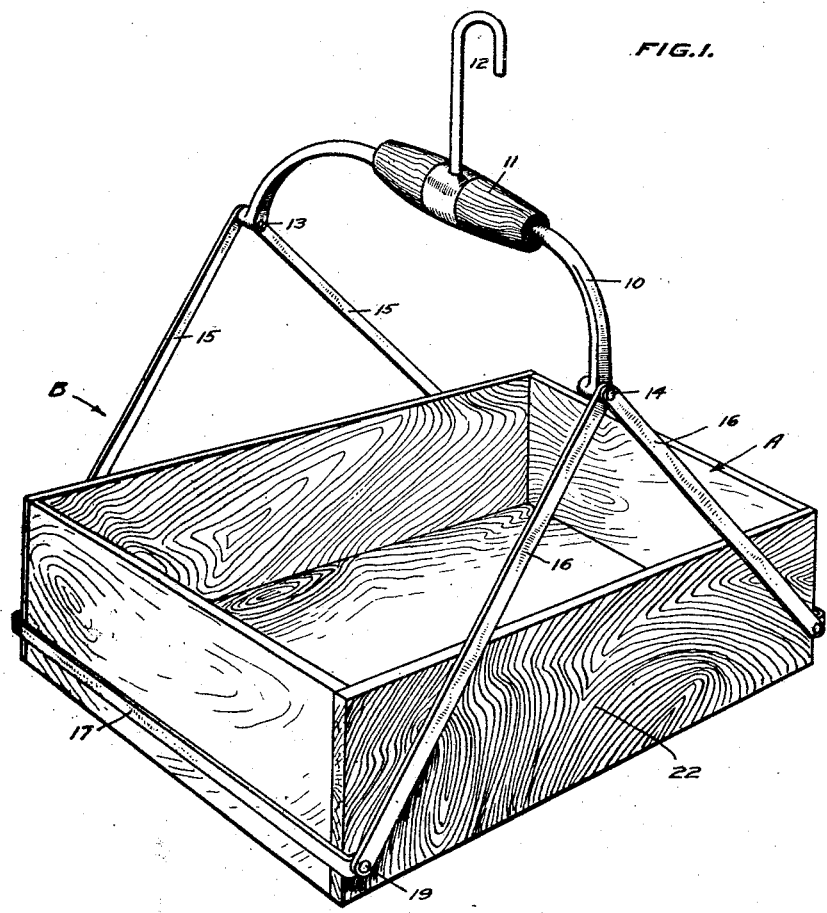
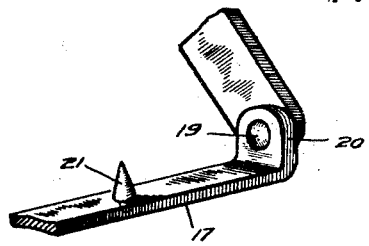

WILLIAM H. BERRY, OF WATSONVILLE, CALIFORNIA.

BOX-HANDLER.

1,366,763.   Specification of Letters Patent.   Patented Jan. 25, 1921.

Application filed October 22, 1919. Serial No. 332,381.

*To all whom it may concern:*

Be it known that I, WILLIAM H. BERRY, a citizen of the United States, residing at Watsonville, in the county of Santa Cruz and State of California, have invented new and useful Improvements in Box-Handlers, of which the following is a specification.

This invention relates to a device for conveniently handling fruit boxes and the like.

It is common practice among fruit growers to supply the fruit pickers with baskets or pails which they carry into the trees, and in which the fruit is deposited. Afterward this fruit is packed in boxes. It will be readily appreciated that this procedure requires a considerable amount of time and inconvenience in the carrying and transfer of the fruit and it is the principal object of the present invention to provide a simple handling device by which the boxes within which the fruit is finally packed may be carried into the trees and supported while the picker fills these boxes and packs them as the picking operation proceeds.

The present invention contemplates the use of a rigid cross bar, to which a handle and a supporting hook may be fastened, said bar being fitted at its opposite ends with pairs of parallel bars pivoted to the ends of the cross bar, and each pair of bars being supplied with a swivel clamping bar pivoted between the free ends thereof and carrying prongs by which the ends of the box may be positively engaged.

The invention is illustrated by way of example in the accompanying drawings, in which—

Fig. 1 is a view in perspective, showing the application of the present invention.

Fig. 2 is a view in perspective, disclosing a fragmentary portion of the device, showing the manner in which the clamping bar is pivotally secured to the side bar.

Referring more particularly to the drawings, 10 indicates a cross bar. This bar is here shown as being slightly arcuate in formation and as being fitted with a suitable handle 11 at its center. A hook 12 is also carried by the bar 10 at a point midway the length of the handle and will permit the structure to be easily supported from the limb of the tree or the like. The opposite ends of the bar 10 are provided with pivot pins 13 and 14, to which yoke structures A and B are pivoted. These yoke structures comprise parallel bars 15 and 16, which are arranged with their ends overlapping and held by the pins 13 and 14. The outer free ends of each set of these bars are provided with a clamping bar 17. This bar extends transversely between the side bars and is there secured by means of pivot pins 19. The pivot pins 19 extend through the ends of the bars 15 and 16 and through an ear 20, one of which is formed at each end of the bar 17. Disposed along the length of each of the clamping bars 17 is a plurality of spurs or prongs 21. These prongs extend substantially at right angles to the surface of each bar 17 and will thus be readily forced into the end of a packing box 22 when it is to be carried. It will be understood that due to the connection between the bars 17 and the parallel bars 15 and 16, it is possible for the bars to pivot around the pins 19, the center of rotation being so disposed as to draw the ends of the pins directly into the face of the boxed ends when pressure is exerted upon the parallel bars.

In carrying out the operation of the present invention, it will be understood that boxes 22 of any size may be used and that it will be necessary for the parallel bars 15 and 16 to be spaced a distance apart from each other greater than the width of the box. The box may be readily lifted by separating the yoke members A and B so that the clamping bars 17 will fall down over the ends of the box, as shown in Fig. 1. It will be evident that when the box handler is then lifted by the cross bar 10 a toggle action will follow, which would tend to draw the two yoke members A and B together. This will, of course, draw the bars 17 against the ends of the boxes and will cause the prongs 21 to be forced into the end wall.

The device may then be lifted by the hook 12 or the handle 10 and in either event a toggle action will be produced to secure the box and cause it to be readily handled. It will also be evident that as the weight of the box and its contents increases, the gripping action will be increased so that the box may be easily suspended from the limb of a tree, if desired, and carried to be placed in a sack or a pile of boxes. It will be evident that when the box is brought to rest upon some support, that the yoke members A and B will instantly move outwardly from their engaging position as the bar 10 is forced downwardly. It will further be noted that due to the small dimensions of the clamping bars 17, the boxes may be easily stacked without further handling, provided that a small space is made between the boxes to permit the withdrawal of the clamping bars.

It will be seen that by the use of the present invention, fruit boxes may be easily handled and supported in a convenient position for a direct picking and packing operation, and furthermore, that the boxes may be easily stacked without transfer from the handling device.

While I have shown the preferred form of my invention, as now known to me, it will be understood that various changes might be made in the combination, construction and arrangement of parts, without departing from the spirit of the invention as claimed.

Having thus described my invention, what I claim and desire to secure by Letters Patent is—

1. A box lifting device comprising a rigid main bar, pairs of parallel bars pivotally connected to the opposite ends of said main bar and clamping bars pivotally secured by their opposite ends to the free ends of said pairs of side bars, said clamping bars having an inwardly extending ear on each of their ends, by which they are pivotally connected to the pairs of bars.

2. A box lifting and handling device composed of a main bar, pairs of parallel side bars pivotally connected to the ends of said main bar, and a transverse box-engaging bar for each pair of side bars pivotally connected thereto and carried entirely thereby for engaging that end of the box toward which its side bars extend, said box engaging bars being movable independently of the respective side bars carrying same.

3. In a box lifting and handling device, a main bar, pairs of side bars connected to the main bar, a straight transverse bar arranged between the side bars of each pair and having a flat box-engaging face with spurs thereon, and means pivotally connecting the ends of the transverse bars to the respective side bars whereby each transverse bar may have independent and rotative adjustment between its side bars.

4. In a box lifting and handling device a main bar having a handle grip thereon, a hook carried at the center of said main bar, and from which it may be dependent, pairs of side bars pivotally connected by their upper ends to the ends of the main bar, said pairs of side bars each having a straight transverse bar portion connecting their other free ends, the inner faces of said transverse portions being disposed at an angle less than 90 degrees to the longitudinal centers of the side bars, whereby said faces will substantially conform to the opposite flat ends of a box interposed between the transverse bar portions of the two pairs of side bars, and a plurality of spur members distributed along said transverse faces and adapted to be forced into box ends when the box is lifted by said device.

In testimony whereof I have hereunto set my hand in the presence of two subscribing witnesses.

WILLIAM H. BERRY.

Witnesses:
W. F. RAUNEGGER,
A. D. BARBER.